United States Patent
Mori et al.

(10) Patent No.: US 7,417,351 B2
(45) Date of Patent: Aug. 26, 2008

(54) ROTARY MACHINE

(75) Inventors: Yoshimi Mori, Mito (JP); Toshiaki Ueda, Naka (JP); Takeshi Sakai, Hitachinaka (JP); Yasuhiko Kimura, Hitachinaka (JP); Shin Onose, Naka (JP); Hiroshi Kanazawa, Hitchinaka (JP); Masahiko Honma, Hitchinaka (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 11/067,736

(22) Filed: Mar. 1, 2005

(65) Prior Publication Data

US 2005/0194857 A1 Sep. 8, 2005

(30) Foreign Application Priority Data

Mar. 2, 2004 (JP) ............................. 2004-057167

(51) Int. Cl.
*H02K 1/00* (2006.01)
(52) U.S. Cl. ...................................... 310/184; 310/198
(58) Field of Classification Search ................ 310/179, 310/184, 198, 201, 207
See application file for complete search history.

(56) References Cited

U.S. PATENT DOCUMENTS

| 4,528,472 A * | 7/1985 | Auinger ...................... 310/198 |
| 6,198,190 B1 | 3/2001 | Umeda et al. |
| 2002/0117928 A1 | 8/2002 | Yasuhara et al. |

| 2003/0214196 A1 | 11/2003 | Cal et al. |
| 2004/0000832 A1 | 1/2004 | Isogai et al. |

FOREIGN PATENT DOCUMENTS

| CN | 1202028 A | 12/1998 |
| CN | 1469531 A | 1/2004 |
| EP | 1 168 574 A2 | 1/2002 |
| JP | 10-004646 | 1/1998 |
| JP | 11-155270 | 6/1999 |
| JP | 2000-164043 | 6/2000 |
| JP | 2002-350422 | 12/2000 |

OTHER PUBLICATIONS

European Search Report dated Aug. 25, 2006 (Five (5) pages).
European Search Report dated Feb. 28, 2007 (Six (6) pages).
Richter, R, "Lehrbuch der Wicklungen eletrischer Maschinen", XP0024204444, 1952, p. 5, pp. 90-91 and pp. 144-156 with an English translation of the pertinent portions (Twenty-six (26) pages).
Chinese Office Action dated Dec. 1, 2006 with English translation (Eight (8) pages).
Chinese Office Action dated Aug. 3, 2007 with English translation (Seven (7) pages).

* cited by examiner

*Primary Examiner*—Dang D Le
(74) *Attorney, Agent, or Firm*—Crowell & Moring LLP

(57) ABSTRACT

A rotary machine having a stator composed of a stator iron core having a plurality of slots formed in the direction of the rotation axis and stator windings inserted into the plurality of slots, wherein the stator windings are composed of a plurality of conductors respectively inserted into the plurality of slots in the direction of the rotation axis and the stator has a connection ring having slots into which the plurality of conductors are inserted in the direction of the rotation axis.

2 Claims, 12 Drawing Sheets

| SLOT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| OUTSIDE CIRCUIT | U1+ | U2+ | U2+ | W1- | W2- | V1+ | V2+ | V2+ | U1- | U2- | W1+ | W2+ | W2+ | V1- | V2- |
|  | U1+ | U2+ | W1- | W2- | W2- | V1+ | V2+ | U1- | U2- | U2- | W1+ | W2+ | V1- | V2- | V2- |
| INSIDE CIRCUIT | U1+ | U1+ | U2+ | W1- | W2- | V1+ | V1+ | V2+ | U1- | U2- | W1+ | W1+ | W2+ | V1- | V2- |
|  | U1+ | U2+ | W1- | W1- | W2- | V1+ | V2+ | U1- | U1- | U2- | W1+ | W2+ | V1- | V1- | V2- |

FIG. 7
| SLOT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| OUTSIDE CIRCUIT | U1+ | U2+ | U2+ | W1- | W2- | V1+ | V2+ | V2+ | U1- | U2- | W1+ | W2+ | W2+ | V1- | V2- |
|  | U1+ | U2+ | W1- | W2- | W2- | V1+ | V2+ | U1- | U2- | U2- | W1+ | W2+ | V1- | V2- | V2- |
| INSIDE CIRCUIT | U1+ | U1+ | U2+ | W1- | W2- | V1+ | V1+ | V2+ | U1- | U2- | W1+ | W1+ | W2+ | V1- | V2- |
|  | U1+ | U2+ | W1- | W1- | W2- | V1+ | V2+ | U1- | U1- | U2- | W1+ | W2+ | V1- | V1- | V2- |
FIG. 8
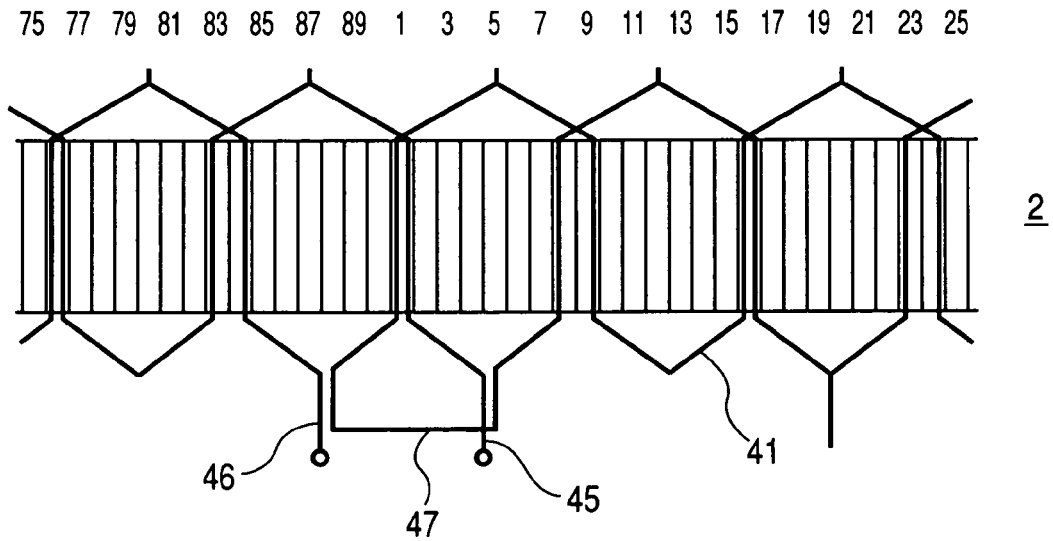
FIG. 9
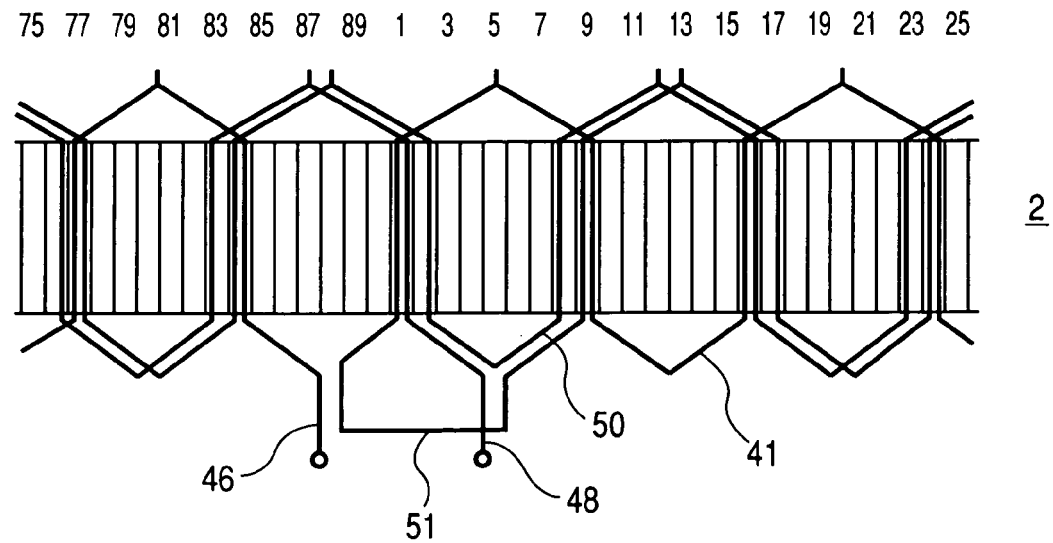

| SLOT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| OUTSIDE CIRCUIT | U1+ | U1+ | U1+ | W1- | W1- | V1+ | V1+ | V1+ | U1- | U1- | W1+ | W1+ | W1+ | V1- | V1- |
|  | U1+ | U1+ | W1- | W1- | W1- | V1+ | V1+ | U1- | U1- | U1- | W1+ | W1+ | V1- | V1- | V1- |
| INSIDE CIRCUIT | V2- | U2+ | U2+ | U2+ | W2- | W2- | V2+ | V2+ | V2+ | U2- | U2- | W2+ | W2+ | W2+ | V2- |
|  | V2- | V2- | U2+ | U2+ | U2+ | W2- | W2- | W2- | V2+ | V2+ | U2- | U2- | U2- | W2+ | V2- |

ROTARY MACHINE

CLAIM OF PRIORITY

The present application claims priority from Japanese application serial no. 2004-057167, filed on Mar. 2, 2004, the content of which is hereby incorporated by reference into this application.

BACKGROUND OF THE INVENTION

The present invention relates to a stator of a rotary machine and more particularly of a rotary machine of an AC generator for vehicle for generating power by being driven by an internal combustion engine and supplying power to a mobile electric load and a mobile power source.

DESCRIPTION OF THE RELATED ART

Conventionally, with respect to connection of a conductor terminal of a stator of a rotary machine, for example, Patent Document 1(Japanese Patent No. 3201397) and Patent Document 2(Japanese Patent No. 3303854) are known. In Patent Document 1, between two conductor terminals neighboring in the peripheral direction, a retainer is arranged in contact with the conductor terminals on both sides to retain the conductor terminals. With the conductor terminals being retained, the front ends thereof are joined to each other. The manufacturing method of Patent Document 1, after junction, moves and releases the retainer. In Patent Document 2, the junction method for notching a conductor terminal, making the sectional area of the notched part smaller than those of other parts, thereby reducing the quantity of input heat is used.

As a conventional winding constitution of a stator, for example, Patent Document 3(Japanese Application Patent Laid-open Publication No. Hei 11-155270) is known. In Patent Document 3, electric conductors stored in a plurality of first slots separating in correspondence with the NS magnetic pole pitch of the stator are connected electrically in series to form a first winding and electric conductors stored in a plurality of second slots neighboring the first slots are connected electrically in series to form a second winding. And, in the connection described in Patent Document 1, the first winding and second winding are connected electrically in series to form the winding of the stator.

SUMMARY OF THE INVENTION

In the connection described in Patent Document 1, the inner diameter and outer diameter of each conductor terminal and the neighboring conductor terminals are retained by the retainers and are fused by TIG. In the aforementioned connection, depending on the contact status of a plurality of retainers and conductors, the heat withdrawal quantity for input heat is changed and the fusion status is changed. Further, in the continuous welding, the retainers serve as a plus electrode. When retainers inserted between a plurality of neighboring conductors are not conducted to the plus electrode, the input heat into the neighboring conductors is increased and the fusion status is changed. When the input heat is high, there is a fear of junction of the retainers and conductors. The fusion area is required to be larger than the sectional area of the conductors, so that the fused part is larger than the sectional area of the conductors. Therefore, the retainers for the inner diameter and outer diameter, after connection, may not be taken out from products.

In the connection described in Patent Document 2, the conductor terminals are notched. However, a step of notching the terminals after cutting the conductors in a fixed size or forming them in a U shape is necessary and line manufacture cannot be realized. Further, to fuse the terminals by TIG, they must be separated on the four surfaces (all the surfaces) and the separation step is complicated. Further, since the terminals are fused, the neighborhood of junction may be made fragile due to the hot shortness, so that as a conductor material, expensive non-oxygen copper must be adopted.

In the connection described in Patent Document 3, the first winding and second winding electrically phase-shifted are connected electrically in series, thus the electromotive ripple force is reduced and the magnetic noise is reduced. However, in the connection described in Patent Document 3, the electric conductors in the same slot are connected electrically in series to form the first winding and second winding. By use of such a constitution, the electromotive force distribution of the stator winding includes a large amount of high frequency component. The high frequency component causes an increase in magnetic noise. To solve it, when conductors constituting a phase winding are arranged in a plurality of neighboring slots, the electromotive force distribution of the stator winding can be made smooth, and the high frequency component included in the electromotive force distribution can be reduced, and the magnetic noise can be reduced. However, by use of the aforementioned winding constitution, arrangement of the conductors in the neighboring slots complicatedly increases the conductor kinds and in correspondence to it, a problem arises that the manufacturing steps are complicated.

An object of the present invention is to examine both sides of the product structure and manufacturing steps and to provide a rotary machine having a stator which can be manufactured easily. Further, another object of the present invention is to provide a rotary machine having a phase winding circuit which can reduce the magnetic noise and can be easily manufactured.

The present invention is a rotary machine having a stator composed of a stator iron core having a plurality of slots formed in the direction of the rotation axis and stator windings inserted into the plurality of slots, wherein the stator windings are composed of a plurality of conductors respectively inserted into the plurality of slots in the direction of the rotation axis and the stator has a connection ring having the slots into which the plurality of conductors are inserted in the direction of the rotation axis.

Further, the present invention is a rotary machine including a stator having a stator iron core having a plurality of slots formed in the direction of the rotation axis and stator windings composed of a plurality of conductors respectively inserted into the plurality of slots and a rotor having a plurality of magnetic poles arranged so that the polarity alternately differs in the rotational direction and an air gap formed between the rotor and the stator, wherein the stator windings are composed of several multi-phase windings, and one multi-phase winding is composed of two or more phase windings, and the phase winding in correspondence to one phase is composed of the plurality of conductors electrically connected across the slots of the stator iron core so as to correspond to the plurality of magnetic poles, and the winding start of one multi-phase winding and the winding end of another multi-phase winding are connected by conductors twisted in the opposite direction of the plurality of conductors electrically connected across the slots of the stator iron core so as to correspond to the plurality of magnetic poles.

And, the present invention is a rotary machine including a stator having a stator iron core having a plurality of slots formed in the direction of the rotation axis and stator windings composed of a plurality of conductors respectively inserted into the plurality of slots and a rotor having a plurality of magnetic poles arranged so that the polarity alternately differs in the rotational direction and an air gap formed between the rotor and the stator, wherein the stator windings are composed of several multi-phase windings, and one multi-phase winding is composed of two or more phase windings, and the phase winding in correspondence to one phase is composed of the plurality of conductors electrically connected across the slots of the stator iron core so as to correspond to the plurality of magnetic poles, and the multi-phase windings are electrically connected by conductors having a different spanning width, and some conductors of neighboring slots have the same phase.

Furthermore, the present invention is a rotary machine including a stator having a stator iron core having a plurality of slots formed in the direction of the rotation axis and stator windings composed of a plurality of conductors respectively inserted into the plurality of slots and a rotor having a plurality of magnetic poles arranged so that the polarity alternately differs in the rotational direction and an air gap formed between the rotor and the stator, wherein the stator windings are composed of several multi-phase windings, and one multi-phase winding is composed of two or more phase windings, and the phase winding in correspondence to one phase is composed of the plurality of conductors electrically connected across the slots of the stator iron core so as to correspond to the plurality of magnetic poles, and in the stator windings, the number of slots per pole and per phase which is decided from the number of phases, the number of slots, and the number of magnetic poles is 2.5, and the number of magnetic poles composed of 5 conductors per magnetic pole is 12, and the number of slots is 90, and the number of phases is 3, and a double circuit of an inside circuit and an outside circuit is formed, and per magnetic pole, a combination of 3 inner conductors and 2 outer conductors and a combination of 2 inner conductors and 3 outer conductors, that is, the combinations of 5 conductors are formed.

Further, the present invention is a rotary machine that for the two magnetic poles of the rotor, that is, for a pair of magnetic poles of the N pole and S pole which are different from each other, 15 slots mentioned above are arranged, and the stator windings are electrically connected by the conductors at an angle that the spanning width is equivalent to 7 slots and at an angle that the twisting angle of both terminals is equivalent to 4 slots.

And, the present invention is a rotary machine that the 3 inner conductors and 3 outer conductors are respectively divided into 2 conductors and 1 conductor, and the 2 inner conductors and 2 outer conductors are respectively divided into one conductor, and each winding is formed to a wave winding.

Furthermore, the present invention is a rotary machine that the conductors divided into two conductors are arranged in the neighboring slots and are electrically connected by the conductors having a different spanning width, thus a circuit is formed.

Further, the present invention is a rotary machine that the winding start and winding end of each wave winding are electrically connected by bridge lines arranged on the innermost layer and outermost layer, thus a circuit is formed.

And, the present invention is a rotary machine that the winding end of the inside circuit and the winding start of the outside circuit are electrically connected by the reversely twisted conductor, thus a circuit is formed.

Furthermore, the present invention is a rotary machine further comprising a connection ring for attaching and fixing the terminal portion when electrically connecting and forming a circuit.

Further, the present invention is a rotary machine including a stator having a stator iron core having a plurality of slots formed in the direction of the rotation axis and stator windings composed of a plurality of conductors respectively inserted into the plurality of slots and a rotor having a plurality of magnetic poles arranged so that the polarity alternately differs in the rotational direction and an air gap formed between the rotor and the stator, wherein the stator windings are composed of several multi-phase windings, and one multi-phase winding is composed of two or more phase windings, and the phase winding in correspondence to one phase is composed of the plurality of conductors electrically connected across the slots of the stator iron core so as to correspond to the plurality of magnetic poles, and in the stator windings, the number of slots per pole and per phase which is decided from the number of phases, the number of slots, and the number of magnetic poles is 2.5, and the number of magnetic poles composed of 5 conductors per magnetic pole is 12, and the number of slots is 90, and the number of phases is 3, and a double circuit of an inside circuit and an outside circuit is formed, and per magnetic pole, a combination of 3 inner conductors and 2 outer conductors and a combination of 2 inner conductors and 3 outer conductors, that is, the combinations of 5 conductors are formed, and for the two magnetic poles of the rotor, that is, for a pair of magnetic poles of the N pole and S pole which are different from each other, 15 slots are arranged, and the stator windings are electrically connected by the conductors at an angle that the spanning width is equivalent to 8 slots and at an angle that the twisting angle of both terminals is equivalent to 3.5 slots.

And, the present invention is a rotary machine that the 3 inner conductors and 3 outer conductors are respectively divided into 2 conductors and 1 conductor, and the 2 inner conductors and 2 outer conductors are respectively divided into one conductor, and each winding is formed to a wave winding.

Furthermore, the present invention is a rotary machine that the conductors divided into two conductors are arranged in the neighboring slots and are electrically connected by the conductors having a different spanning width, thus a circuit is formed.

Further, the present invention is a rotary machine that the winding start and winding end of each conductor which is formed to a wave winding are electrically connected by bridge lines arranged on the innermost layer and outermost layer, thus a circuit is formed.

And, the present invention is a rotary machine including a stator having a stator iron core having a plurality of slots formed in the direction of the rotation axis and stator windings composed of a plurality of conductors respectively inserted into the plurality of slots and a rotor having a plurality of magnetic poles arranged so that the polarity alternately differs in the rotational direction and an air gap formed between the rotor and the stator, wherein the stator windings are composed of several multi-phase windings, and one multi-phase winding is composed of two or more phase windings, and the phase winding in correspondence to one phase is composed of the plurality of conductors electrically connected across the slots of the stator iron core so as to correspond to the plurality of magnetic poles, and in the stator windings, the number of slots per pole and per phase which is decided from the number of phases, the number of slots, and the number of magnetic poles is 2.5, and the number of magnetic poles composed of 5 conductors per magnetic pole is 12, and the number of slots is 90, and the number of phases of the stator windings is 3, and a double circuit of an inside circuit and an outside circuit is formed, and per magnetic pole, a combination of 5 inner conductors and 0 outer conductors and a combination of 0 inner conductors and 5 outer conductors, that is, the combinations of unbalanced windings are formed.

The stator of the rotary machine of the present invention is characteristically multipoint-connected by the connection ring. When the conductor terminals are connected by the connection ring, there is no need to work on the conductor terminals such as notching. Further, when the connection ring is attached to the conductor terminals, the terminal position is fixed, so that the retainer for positioning the conductors is not required. When the conductor terminals are connected and the connection ring is separated, an armature winding is formed. In the aforementioned method, since the connection ring is connected, the sectional area of the joined part can be set to the sectional area of one conductor or more. The connection method can be executed by fusing, so that the terminals are separated on two surfaces and can be connected. Further, the joined part is not fused, so that there is no need to use expensive non-oxygen copper and ordinary tough pitch copper can be used.

In another stator of the rotary machine of the present invention, the high frequency component included in the electromotive force distribution can be reduced and the magnetic noise can be reduced. Further, the aforementioned stator of the rotary machine is characterized in consideration of the producibility and process simplification.

Other objects, advantages and novel features of the present invention will become apparent from the following detailed description of the invention when considered in conjunction with the accompanying drawings.

BRIEF DESCRIPTION OF THE DRAWINGS

FIG. 7 is a layout diagram of the slots per two magnetic poles of the rotor in Embodiment 4;

FIG. 8 is a 2T circuit diagram of the stator winding of the rotary machine in Embodiment 4;

FIG. 9 is a 3T circuit diagram of the stator winding of the rotary machine in Embodiment 4;

DESCRIPTION OF THE PREFERRED EMBODIMENTS

Figure 1:
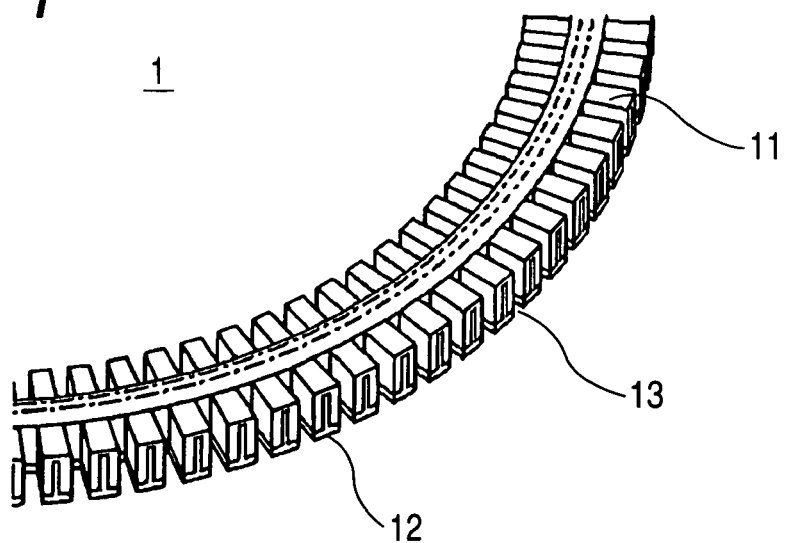
FIG. 1 is an enlarged view of the connection ring in Embodiment 1.

The preferred embodiments for executing the present invention will be explained hereinafter. The stator of the rotary machine of the present invention for facilitating manufacture can be realized by use of a constitution of attaching a connection ring to a plurality of conductor terminals and fixing the connection position.

Each conductor terminal of a stator winding can be structured so as to simultaneously execute two-surface separation symmetrical right and left for the wide surface at the time of cutting in fixed size and forming the front end in a nail shape symmetrical right and left and symmetrical up and down. The conductor cut in a fixed size is formed in a U shape in the forcibly retained state and a plurality of conductors necessary for a stator winding per machine can be manufactured continuously from cutting in a fixed size to forming in a U shape. Since the front end is formed in a nail shape, into a stator iron core with a plurality of slots formed, a plurality of conductors can be inserted at a time in the direction of the rotation axis. Further, the connection ring can be easily attached at the conductor terminal position. By use of a constitution that the connection ring is attached and the connection position is fixed, it can be formed to a constitution that the neighboring conductor terminals can preserve a uniform insulating space.

The stator of the rotary machine of the present invention for reducing the magnetic noise can be realized by use a constitution that the number of magnetic poles is 12, and the number of slots is 90, and the number of phases of the stator winding is 3, and the number of slots per pole and per phase which is decided from the number of poles is 2.5, and one magnetic pole is composed of 5 conductors. For the conductors inserted into the stator winding in the axial direction, there is a problem imposed in the periodicity, so that the number of winding conductors stored in one slot must be an even number. In the aforementioned stator of the rotary machine, 4 conductors are arranged in each slot, and in a plurality of neighboring slots, 5 conductors are arranged for each magnetic pole, and the conductors per magnetic pole are formed by a double circuit of an inside circuit and an outside circuit, so that the manufacturing process can be divided and the equipment can be simplified. Further, in the phase winding, the inside circuit and outside circuit are combined, and 5 conductors combining 3 conductors of the inside circuit and 2 conductors of the outside circuit and 5 conductors combining 2 conductors of the inside circuit and 3 conductors of the outside circuit are combined, thus an almost balanced winding can be obtained and the magnetic noise can be reduced. In the stator of the rotary machine mentioned above, per two magnetic poles (a pair of N pole and S pole which are different from each other) of the rotor, 15 slots are arranged. The inside circuit and outside circuit are composed of a wave winding circuit and the number of windings per phase is 30. The wave winding circuit makes a round of six windings and the slot position of the winding start and the slot position of the winding end of the sixth winding are the same slot. When the second round starts winding from the neighboring slot, the winding end of the first round is connected to the winding start of the second round. Therefore, the conductor of the sixth winding at the winding end of the first round is a conductor having a different spanning width and when it is arranged at the neighboring slot position, for the winding start of the second round starting winding from the neighboring slot and the winding end of the second round, the connection can be abolished. In the phase winding, when the winding is started from the inside, the winding end of the inside circuit is connected to the winding start of the outside circuit. Therefore, when the conductor at the winding end of the inside circuit is formed in a reversely twisted shape of the twisting direction of the other conductors, it can be set at the slot position of winding start of the outside circuit free of interference with the other conductors and the connection of the winding end of the inside circuit and the winding start of the outside circuit can be abolished. Further, in the phase winding, the terminals are connected, thus the circuit is formed. However, the connection ring is attached to the terminals, thus the terminal position can be surely fixed and a stable connection can be obtained. Hereinafter, the embodiments of the rotary machine of the present invention will be explained with reference to the accompanying drawings.

Embodiment 1

Figure 2:
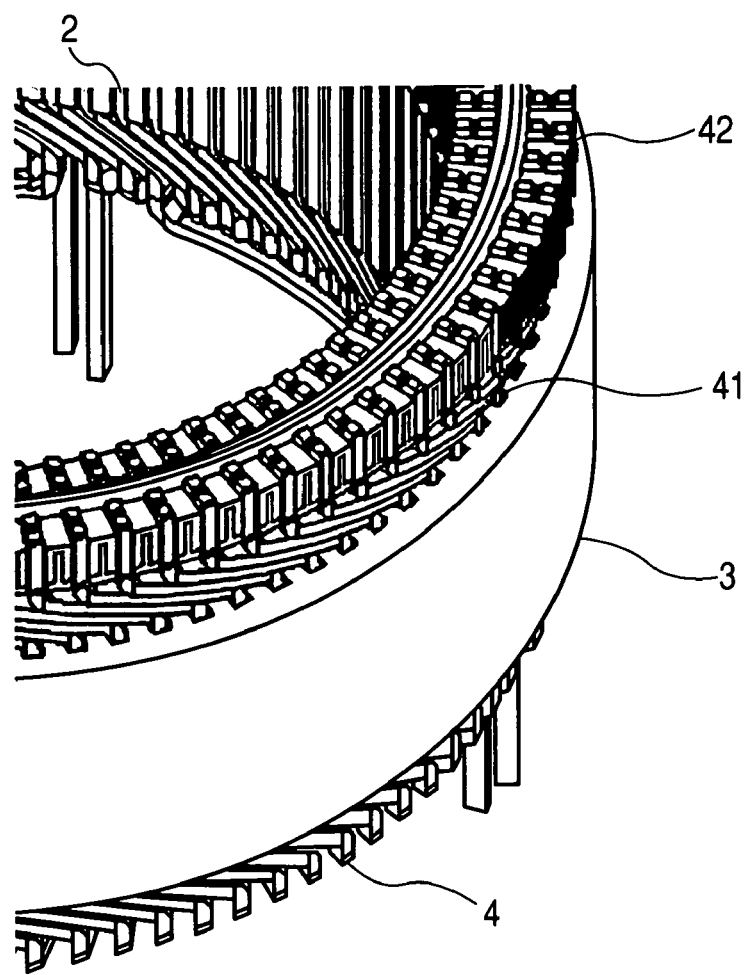
FIG. 2 is an enlarged view of the connection ring attached status in Embodiment 1.
Figure 3:
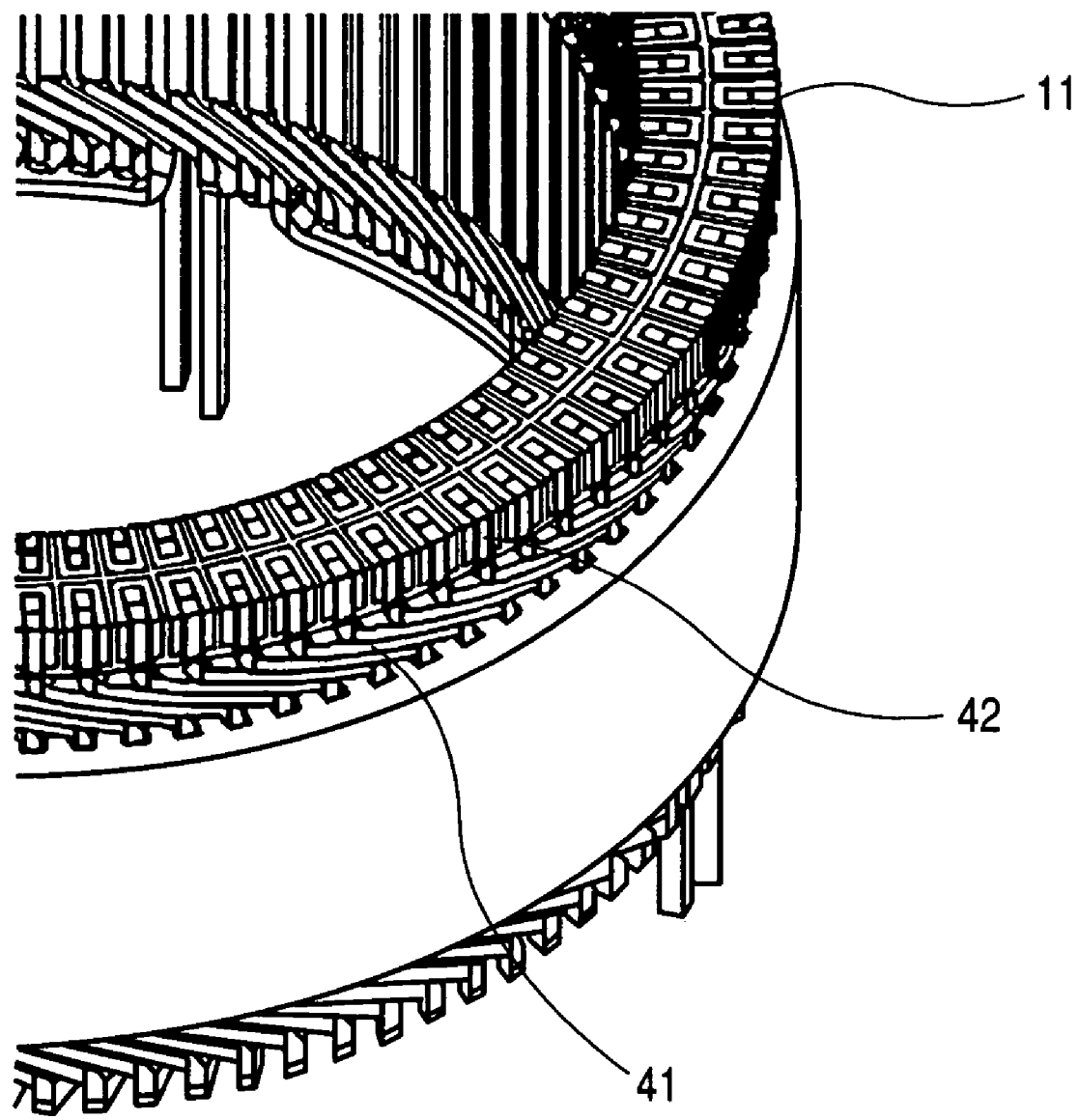
FIG. 3 is an enlarged view of the status of the connection ring after division in Embodiment 1.
Figure 4:
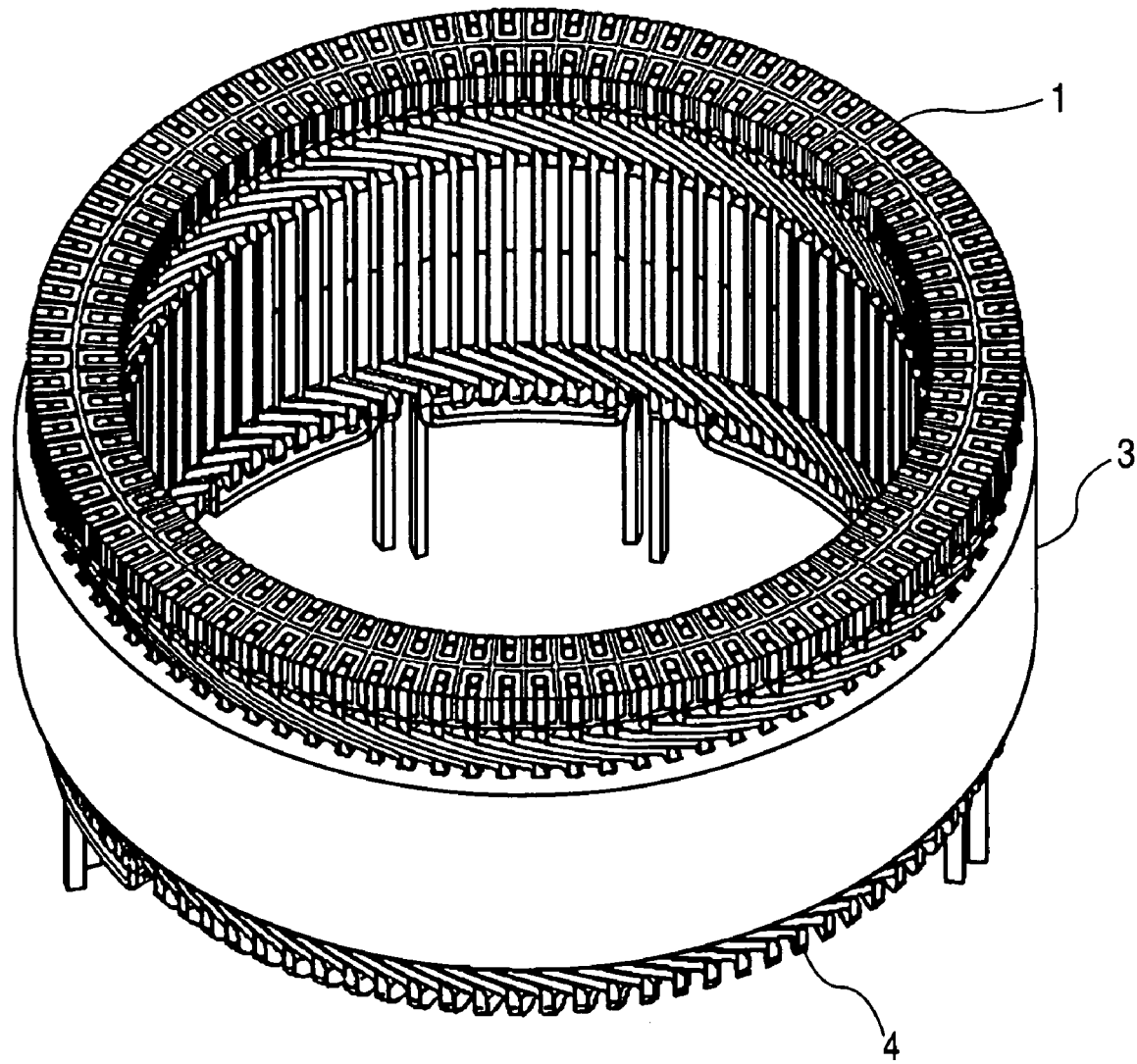
FIG. 4 is a status diagram of the connection ring after division in Embodiment 1.

Embodiment 1 will be explained below. FIG. 1 shows an enlarged view of the connection ring used in this embodiment, and FIG. 2 shows an enlarged view of the connection ring attached status, and FIG. 3 shows an enlarged view of the status of the connection ring after division, and FIG. 4 shows a status diagram of the connection ring after division. FIGS. 1 to 4 show an example that the number of slots is 90 and 4 conductors are arranged in each slot.

In FIG. 1, a connection ring 1 is composed of a conductor portion 11 and an insulating portion 12. The connection ring 1 has a plurality of slots 13 corresponding to the number of connection points of a terminal portion 42 of a plurality of conductors 41, and between the plurality of slots 13 and the plurality of neighboring slots 13, the insulating portion 12 is arranged, thus uniform insulation is obtained. Four conductors are arranged in each slot, so that with respect to the terminal portion 42, from the outer peripheral side, the first and second terminals and the third and fourth terminals are connected in a twin state, thus 90 slots 13 of the connection ring 1 are arranged on the outer peripheral side and 90 slots 13 are arranged on the inner peripheral side. The upper part of the conductor portion 11 is connected and continuity reservation at the time of attaching to the conductor terminals and connection by fusing is taken into account.

In FIG. 2, in a stator 2, in a stator iron core 3 having a plurality of slots formed in the direction of the rotation axis, a conductor group 4 is inserted and arranged in the direction of the rotation axis. In the terminal portion 42 of the plurality of conductors 41, two wide surfaces are cut and each front end is formed in a nail shape. The connection ring 1 is attached to the terminal portion 42 of the plurality of conductors 41 of the stator 2. In FIGS. 3 and 4, the connection ring, after attaching, is tightened temporarily by calking by pushing the terminal portion 42 into the slots 13 of the connection ring 1 and is thermally tightened by fusing in this posture kept. Next, the upper part of the conductor portion 11 is cut, and the connection ring 1 is separated, thus the stator winding is formed.

Embodiment 2

Figure 5:
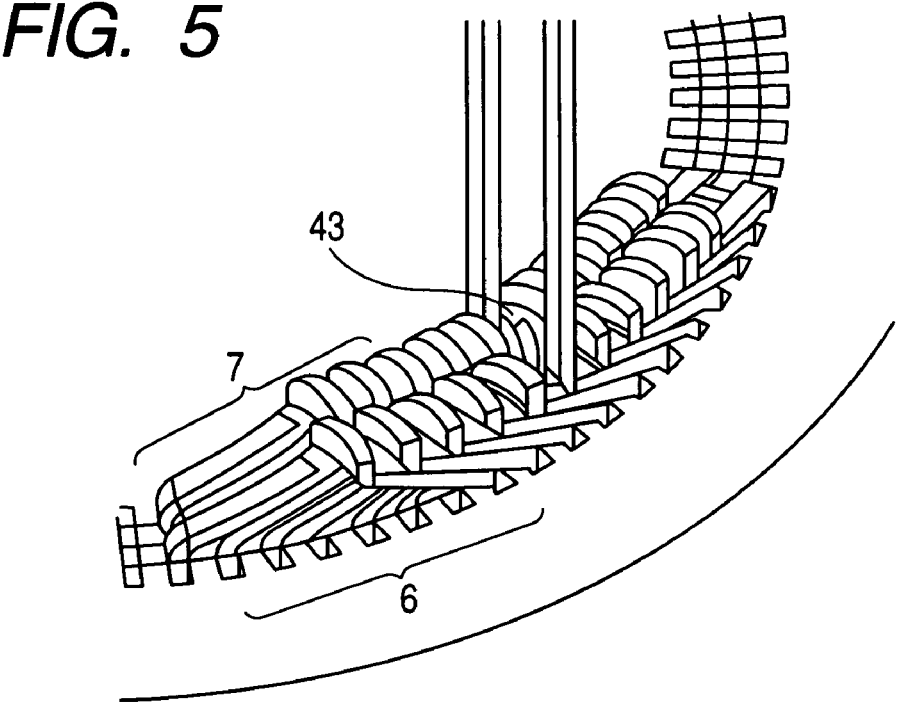
FIG. 5 is an enlarged view of the status that reversely twisted conductors are connected in Embodiment 2.

Embodiment 2 will be explained below. FIG. 5 is an enlarged view of the status that reversely twisted conductors are connected and shows an example that the number of slots is 90 and 4 conductors are arranged in each slot. Four conductors are arranged in each slot, so that the phase winding is formed by an outside circuit 6 composed of a plurality of first and second conductors 41 from the outer peripheral side and an inside circuit 7 composed of a plurality of third and fourth conductors 41 and is formed by connecting a conductor 46 at the winding end of the outside circuit and a conductor 48 at the winding start of the inside circuit. The connection of the conductor 46 at the winding end of the outside circuit and the conductor 48 at the winding start of the inside circuit can be abolished by use of reversely twisted conductors 43.

Embodiment 3

Figure 6:
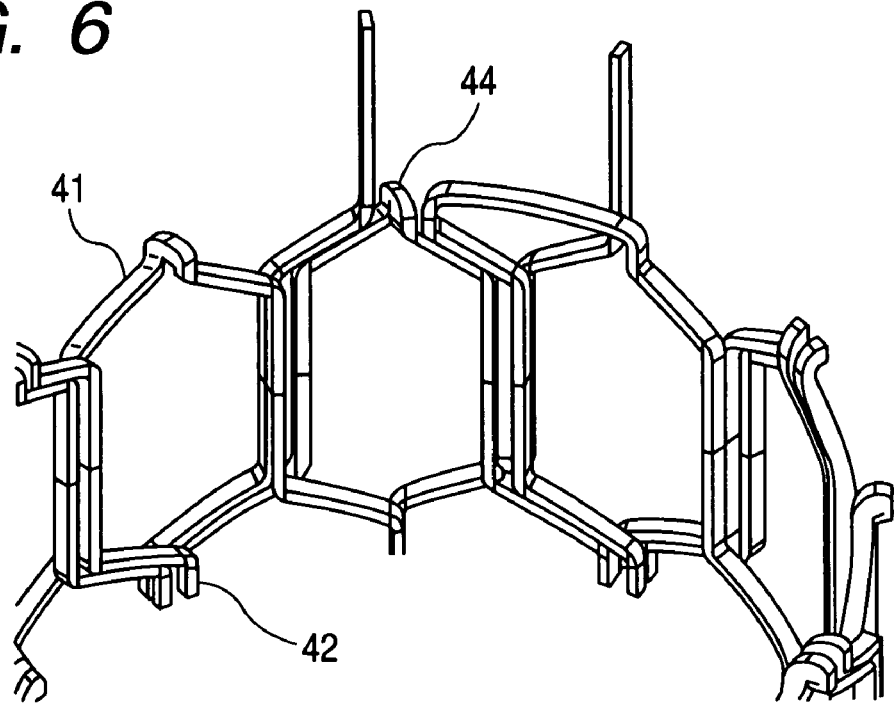
FIG. 6 is an enlarged view of the status that conductors having a different spanning width are connected in Embodiment 3.

Embodiment 3 will be explained below. FIG. 6 is an enlarged view of the status that the conductors having a different spanning width are connected and shows an example of a winding circuit in which the number of magnetic poles is 12, and the number of slots is 90, and the number of phases of the stator winding is 3, and the number of slots per pole and per phase which is decided from the number of poles is 2.5, and one magnetic pole is composed of 5 conductors, and 4 conductors are arranged in each slot.

In the winding circuit, four conductors are arranged in each slot in a row in the radial direction, and the conductors are divided into the first and second conductors and the third and fourth conductors from the outer peripheral side, and the outside circuit 6 composed of the first and second conductors of the plurality of slots and the inside circuit 7 composed of the third and fourth conductors thereof are combined.

In the outside circuit 6 mentioned above, per two magnetic poles (a pair of N pole and S pole which are different from each other) of the rotor, 15 slots are arranged. The plurality of conductors 41 are in a shape twisted so that the spanning width is equivalent to 7 slots and both terminal sides are respectively equivalent to 4 slots or the spanning width is equivalent to 8 slots and both terminal sides are respectively equivalent to 3.5 slots, and the terminals at both ends are respectively arranged in the first slot and the second slot from the outer peripheral side. The first terminal of the terminal portion 42 of the plurality of conductors 41 and the second terminal of the terminal portion 42 of the other plurality of conductors 41 are connected. The connection is sequentially repeated to form a wave winding and the wave winding makes a round of 6 windings at the winding start position. To make the neighboring slots equal in the phase, in the location where the plurality of conductors 41 at the sixth winding are arranged, by arranging conductors 44 having a different spanning width without connecting the winding end at the first round to the winding start at the second round arranged in the neighboring slot, a wave winding can be formed.

Embodiment 4

Embodiment 4 will be explained below. FIG. 7 shows a layout diagram of the slots per two magnetic poles of the rotor, and FIG. 8 shows a 2T circuit diagram of the stator winding of the rotary machine, and FIG. 9 shows a 3T circuit diagram of the stator winding of the rotary machine.

In FIG. 7, in the winding circuit in which the number of magnetic poles is 12, and the number of slots is 90, and the number of phases of the stator winding is 3, and the number of slots per pole and per phase which is decided from the number of poles is 2.5, and one magnetic pole is composed of 5 conductors, per two magnetic poles (a pair of N pole and S pole which are different from each other) of the rotor, 15 slots are arranged. Further, four conductors are arranged in each slot and in a plurality of neighboring slots, five conductors are arranged for each magnetic pole.

In the winding circuit, four conductors are arranged in each slot in a row in the radial direction, and the conductors are divided into the first and second conductors and the third and fourth conductors from the outer peripheral side, and the inside circuit 7 composed of the third and fourth conductors of the plurality of slots and the outside circuit 6 composed of the first and second conductors thereof are combined, and 5 conductors combining 3 conductors of the inside circuit 7 and 2 conductors of the outside circuit 6 and 5 conductors combining 2 conductors of the inside circuit 7 and 3 conductors of the outside circuit 6 are combined, thus an almost balanced winding can be obtained.

In FIG. 8, the 2T circuit of the outside circuit 6 will be explained below. The conductor group 4 arranged in the stator 2 is composed of the plurality of conductors 41, the winding start conductor 45, the winding end conductor 46, and the bridge lines 47. The plurality of conductors 41 are in a shape that the spanning width is equivalent to 7 slots, and the twisting angle is 28°, and the terminals at both ends are respectively arranged in the first slot and second slot from the outer peripheral side.

The winding start conductor 45 arranged in the second slot from the outer peripheral side of the slot No. 1 of the stator 2 is connected to the plurality of conductors 41 arranged in the first slot of the slot No. 83. The other terminal of the plurality of conductors 41 arranged in the first slot of the slot No. 83 is arranged in the second slot of the slot No. 76 across 7 slots. The other plurality of conductors 41 are arranged in the first slot of the slot No. 68 and the second slot of the slot No. 61.

The terminal in the second slot of the slot No. 76 and the terminal in the first slot of the slot No. 68 are connected, though since the terminals are positioned across 8 slots, they are mutually positioned and connected at a twisting angle of 16° equivalent to 4 slots to form the circuit.

In the plurality of conductors 41, the circuit is formed by sequentially repeating the process as mentioned above. However, when the plurality of conductors 41 are arranged in the first slot of the slot No. 8, the other is arranged in the second slot of the slot No. 1 and interferes with the winding start conductor 45. Here, bridge lines 47 positioned in the first slot of the slot No. 8 and the first slot of the slot No. 1 are arranged to prevent interference.

In the drawing, the winding from the winding start conductor 45 to the bridge lines 47 is a counterclockwise wave winding and the winding from the bridge lines 47 to the winding end conductor 46 is a clockwise wave winding.

The terminal in the first slot of the slot No. 1 of the bridge lines 47 and the terminal in the second slot of the slot No. 9 of the plurality of conductors 41 arranged in the second slot of the slot No. 9 and the first slot of the slot No. 16 are connected.

Next, the terminal in the first slot of the slot No. 16 of the plurality of conductors 41 arranged in the second slot of the slot No. 9 and the first slot of the slot No. 16 and the terminal in the second slot of the slot No. 24 of the plurality of conductors 41 arranged in the second slot of the slot No. 24 and the first slot of the slot No. 31 are connected. The circuit is formed by sequentially repeating the process as mentioned above and the terminal in the first slot of the slot No. 76 of the plurality of conductors 41 arranged in the second slot of the slot No. 69 and the first slot of the slot No. 76 and the winding end conductor 46 arranged in the second slot of the slot No. 84 are connected.

Finally, the 2T wave winding circuit which starts from the winding start conductor 45, is connected counterclockwise to the bridge lines 47 via 5 conductors 41, is positioned in the neighboring slot of the bridge lines 47, and ends counterclockwise this time at the winding end conductor 46 via 5 conductors 41 is formed.

In FIG. 9, the 3T circuit of the inside circuit will be explained below. The conductor group arranged in the stator 2 is composed of the plurality of conductors 41, the winding start conductor 48, the winding end conductor 49, conductors 50 having a different spanning width, and bridge lines 51.

The plurality of conductors 41 are in a shape that the spanning width is equivalent to 7 slots, and the twisting angle is 28°, and the terminals at both ends are respectively arranged in the third slot and fourth slot from the outer peripheral side of the slots. The conductors 50 having a different spanning width are in a shape that the spanning width is equivalent to 6 slots, and the twisting angle is 24°, and the terminals at both ends are respectively arranged in the third slot and fourth slot from the outer peripheral side of the slots.

The winding start conductor 41 arranged in the third slot from the outer peripheral side of the slot No. 1 of the stator 2 is connected to the plurality of conductors 41 arranged in the fourth slot of the slot No. 83. The other terminal of the plurality of conductors 41 arranged in the fourth slot of the slot No. 83 is arranged in the third slot of the slot No. 76 across 7 slots. The other plurality of conductors 41 are arranged in the fourth slot of the slot No. 68 and the third slot of the slot No. 61.

The terminal in the third slot of the slot No. 76 and the terminal in the fourth slot of the slot No. 68 are connected, though since the terminals are positioned across 8 slots, they are mutually positioned and connected at a twisting angle of 16° equivalent to 4 slots to form the circuit.

In the plurality of conductors 41, the circuit is formed by sequentially repeating the process as mentioned above. However, when the plurality of conductors 41 are arranged in the fourth slot of the slot No. 8, the other is arranged in the third slot of the slot No. 1 and interferes with the winding start conductor 48. Here, the conductors 50 having a different spanning width for connecting the fourth slot of the slot No. 8 and the third slot of the slot No. 2 are arranged to make the neighboring slots equal in the magnetic pole. The terminal in the third slot of the slot No. 2 of the conductors 50 having a different spanning width is connected to the plurality of conductors 41 arranged in the fourth slot of the slot No. 84.

The other terminal of the plurality of conductors 41 arranged in the fourth slot of the slot No. 84 is arranged in the third slot of the slot No. 77 across 7 slots. The other plurality of conductors 41 are arranged in the fourth slot of the slot No. 69 and the third slot of the slot No. 62.

In the plurality of conductors 41, the circuit is formed by sequentially repeating the process as mentioned above. However, when the plurality of conductors 41 are arranged in the fourth slot of the slot No. 9, the other is arranged in the third slot of the slot No. 2 and interferes with the conductors 50 having a different spanning width. Here, the bridge lines 51 for connecting the fourth slot of the slot No. 9 and the fourth slot of the slot No. 1 are arranged to prevent interference between the conductors. In the drawing, the winding from the winding start conductor 48 to the bridge lines 51 is a counterclockwise wave winding and the winding from the bridge lines 51 to the winding end conductor 49 is a clockwise wave winding. The terminal in the fourth slot of the slot No. 1 of the bridge lines 51 and the terminal in the third slot of the slot No. 9 of the plurality of conductors 41 arranged in the third slot of the slot No. 9 and the fourth slot of the slot No. 16 are connected.

Next, the terminal in the fourth slot of the slot No. 17 of the plurality of conductors 41 arranged in the third slot of the slot No. 9 and the fourth slot of the slot No. 17 and the terminal in the third slot of the slot No. 24 of the plurality of conductors 41 arranged in the third slot of the slot No. 24 and the fourth slot of the slot No. 32 are connected. The circuit is formed by sequentially repeating the process as mentioned above and the terminal in the fourth slot of the slot No. 77 of the plurality of conductors 41 arranged in the third slot of the slot No. 69 and the fourth slot of the slot No. 77 and the winding end conductor 49 arranged in the third slot of the slot No. 84 are connected.

Finally, the 2T wave winding circuit which starts from the winding start conductor 48, is connected counterclockwise to the conductors 50 having a different spanning width via 5 conductors 41, is positioned in the neighboring slot of the conductors 50 having a different spanning width, and furthermore reaches counterclockwise the bridge lines 51 via 5 conductors 41 is formed, and the 3T wave winding circuit ending counterclockwise this time at the winding end conductor 49 via 5 conductors 41 is formed.

Figure 10:
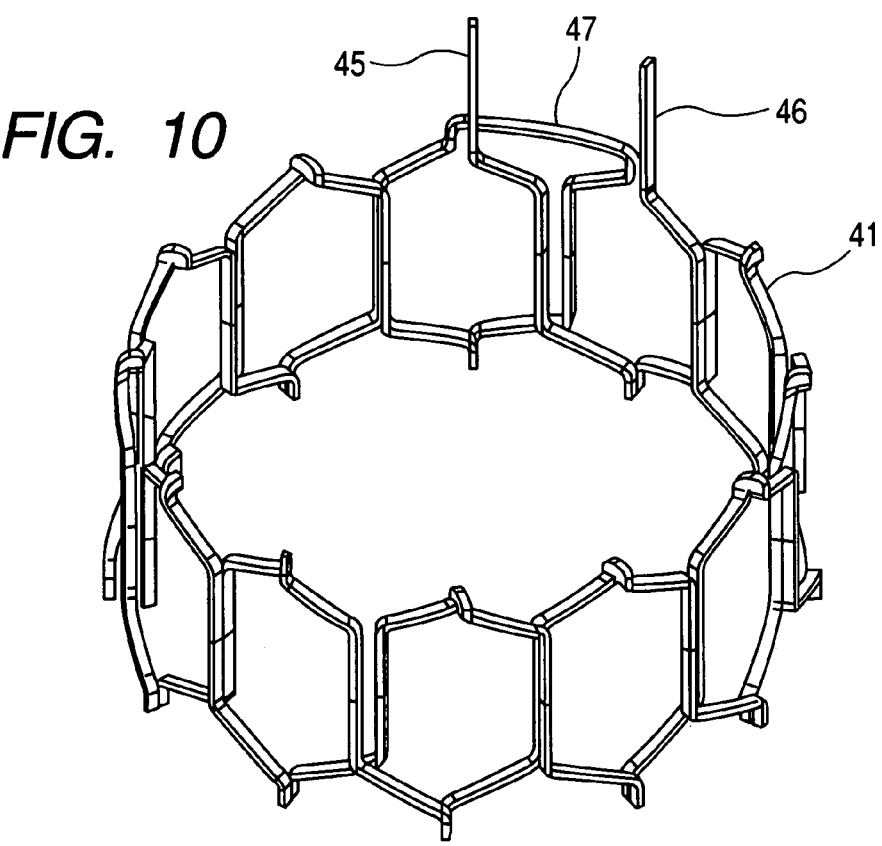
FIG. 10 is an appearance view of the outside circuit of the stator which is wave-wound by 2T in Embodiment 4.

FIG. 10 shows an appearance of the outside circuit of the stator which is wave-wound by 2T. The drawing shows a status that the winding from the winding start conductor 45 to the bridge lines 47 via 5 conductors 41 is a clockwise wave winding and the winding from the bridge lines 47 to the winding end conductor 46 via 5 conductors 41 is a counterclockwise wave winding.

Figure 11:
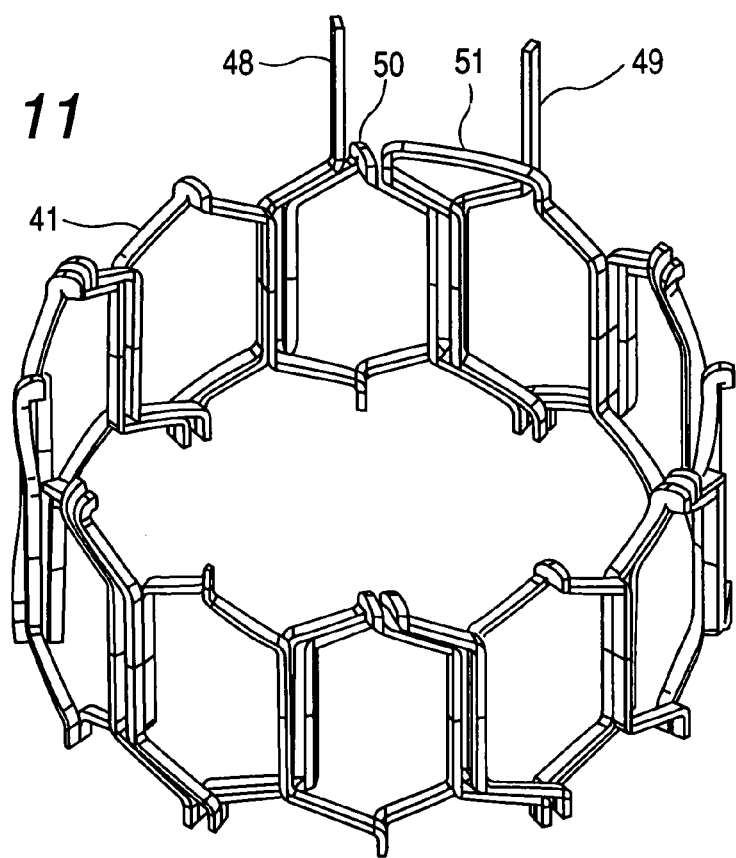
FIG. 11 is an appearance view of the outside circuit of the stator which is wave-wound by 3T in Embodiment 4.

FIG. 11 shows an appearance of the inside circuit of the stator which is wave-wound by 3T. The drawing shows a status that the winding which is connected from the winding start conductor 48 to the conductors 50 having a different spanning width via 5 conductors 41 and extends from the conductors 50 having a different spanning width to the bridge lines 51 via 5 conductors 41 is a counterclockwise wave winding and the winding extending from the bridge lines 51 to the winding end conductor 49 via 5 conductors 41 is a clockwise wave winding.

Figure 12:
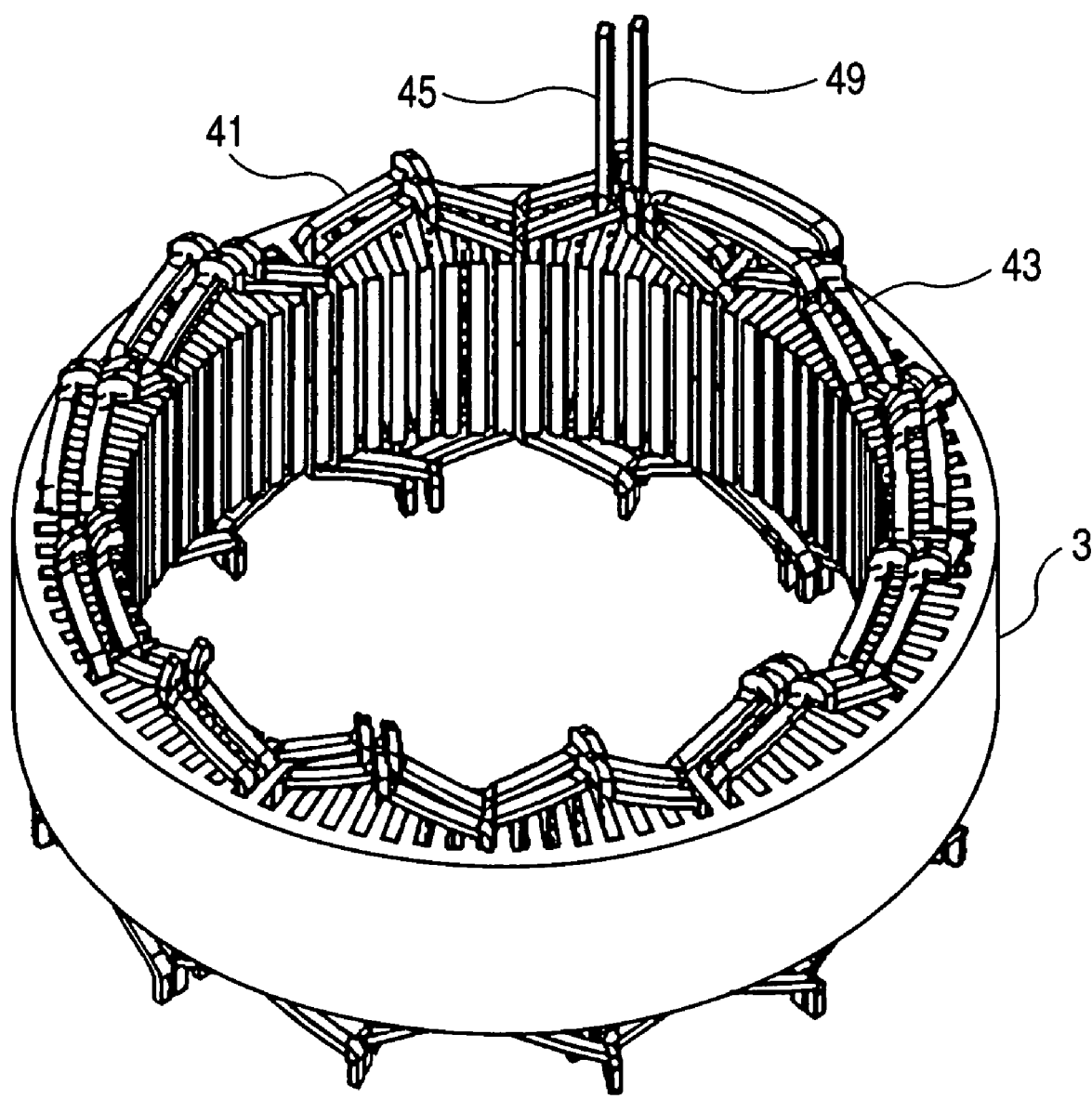
FIG. 12 is an appearance view of the stator of the rotary machine in which the part in correspondence to one phase is attached in Embodiment 4.

FIG. 12 shows an appearance of the stator of the rotary machine in which the part in correspondence to one phase is attached. The drawing shows a status that the outside 2T circuit and the inside 3T circuit are combined to a 5T wave winding. When the winding end conductor 46 of the 2T circuit and the winding start conductor 48 of the 3T circuit are connected, a 5T circuit is formed. However, in place of the winding end conductor 46 and the winding start conductor 48, when the reversely twisted conductors 43 are arranged, the connection can be abolished and a one-phase part attached constitution of a 5T circuit from the winding start conductor 45 of the 2T circuit to the winding end conductor 49 of the 3T circuit is obtained.

Even in a combination of the 5T wave winding obtained by combination of the outside 3T circuit and the inside 2T circuit, in the same way as with the aforementioned, when the winding end conductor of the 3T circuit and the winding start conductor of the 2T circuit are connected, a one-phase part attached constitution of the 5T circuit from the winding start conductor of the 3T circuit to the winding end conductor of the 2T circuit can be obtained.

Figure 13:
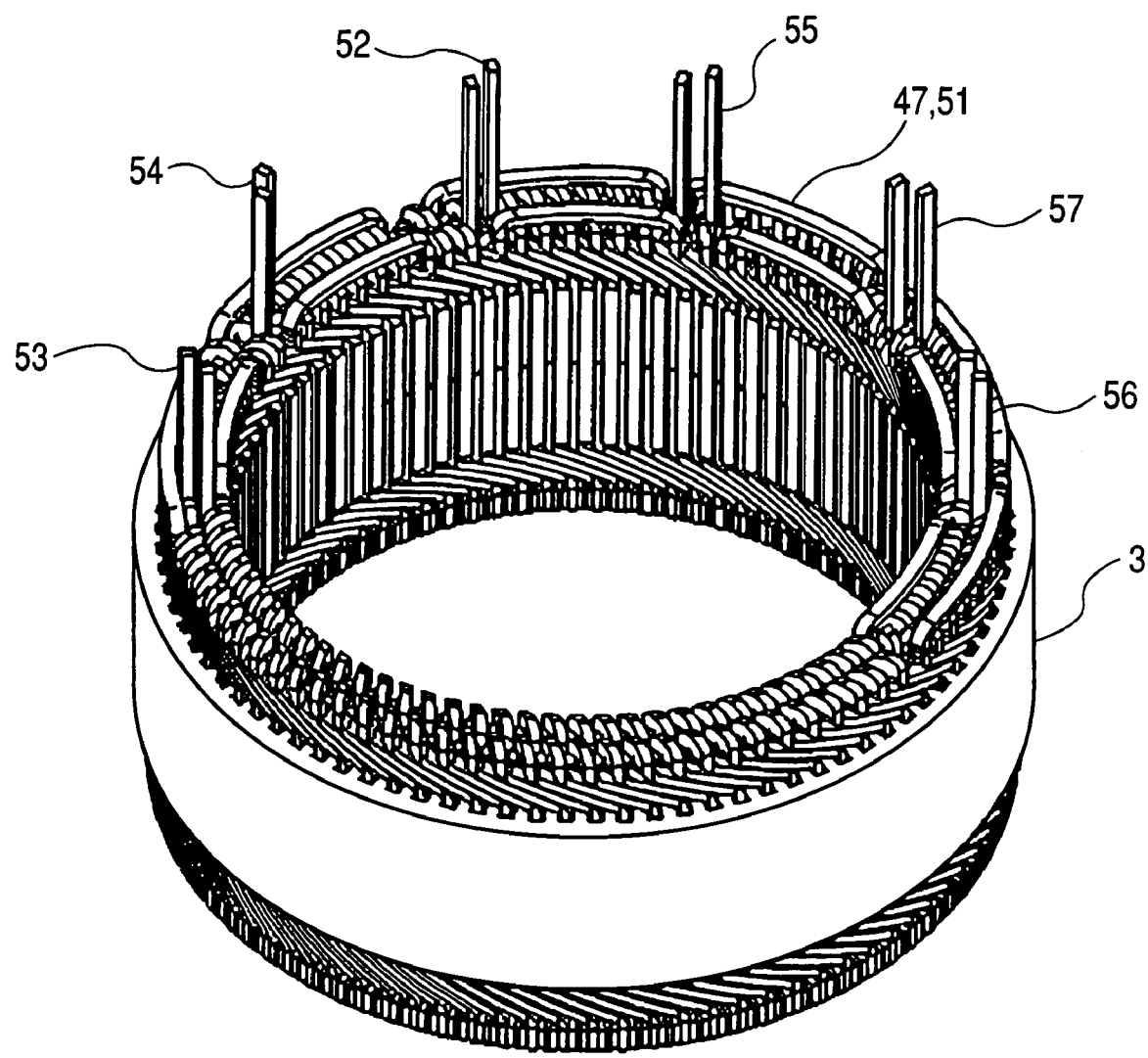
FIG. 13 is an appearance view of the stator winding of the rotary machine in Embodiment 4.

FIG. 13 shows an appearance of the stator winding of the rotary machine. The stator winding is composed of two Y circuits in which phase windings 52, 53, and 54 composed of 5 windings combining 2 inside windings and 3 outside windings and phase windings 55, 56, and 57 composed of 5 windings combining 3 inside windings and 2 outside windings are arranged in appropriate positions and the phase is different at an electrical angle of 28.8°. In the drawing, one terminal portion of each of the windings 52, 53, and 54 composed of 5 windings combining 2 inside windings and 3 outside windings is connected to form a neutral point. Further, one terminal portion of each of the windings 55, 56, and 57 composed of 5 windings combining 3 inside windings and 2 outside windings is connected to form a neutral point. The bridge lines 47 and 51 are arranged in the innermost layer in the position of the fourth slot and the outermost layer in the position of the first slot to form a circuit.

Figure 14:
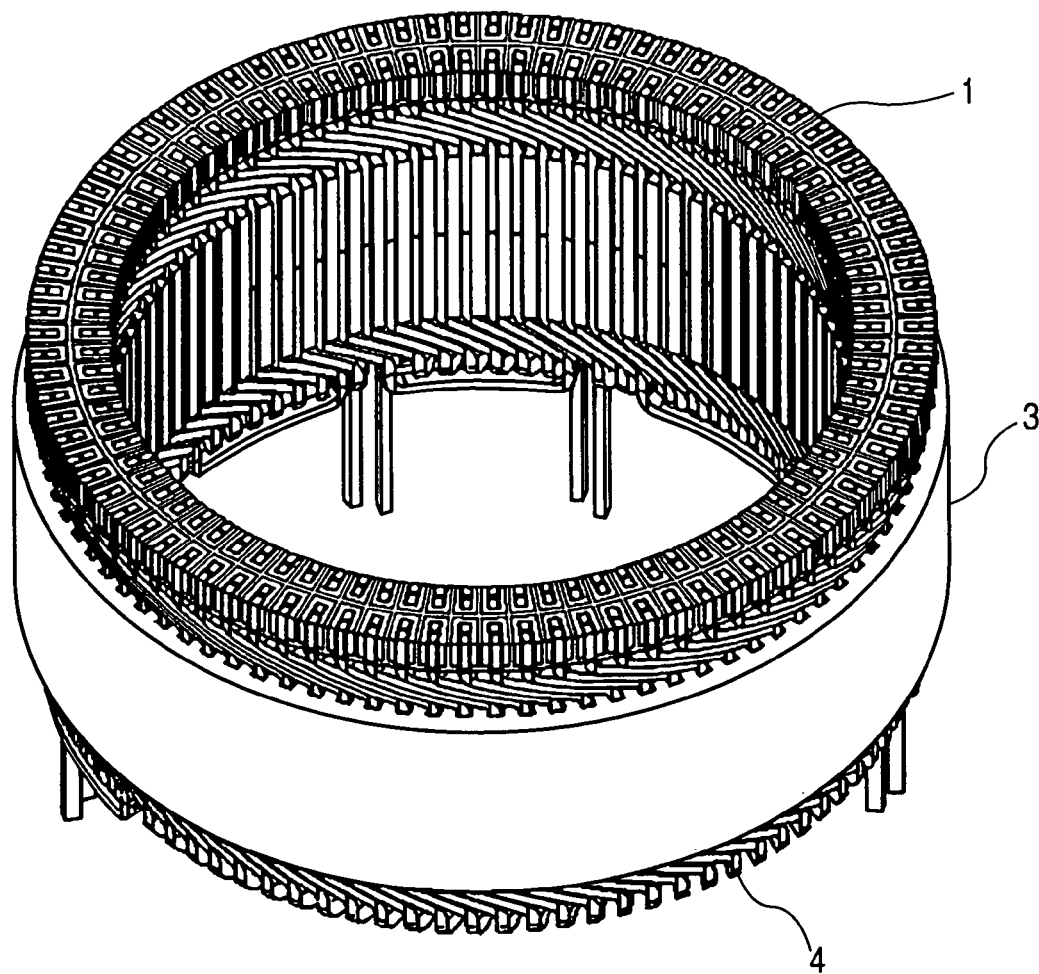
FIG. 14 is an attaching appearance view of the connection ring of the stator of the rotary machine in Embodiment 4.

FIG. 14 shows an attaching appearance of the connection ring of the stator of the rotary machine. The connection ring 1, after attaching, is tightened temporarily by calking by pushing the terminal portion 42 into the slots 13 of the connection ring 1 and is thermally tightened by fusing in this posture kept. Next, the upper part of the conductor portion 11 is cut, and the connection ring 1 is separated, thus the stator winding is formed.

In the manufacturing method for the winding circuit, it is impossible to produce and attach a circuit for each phase and it is a prior condition to produce by all conductor simultaneous forming and simultaneous insertion.

For the winding circuit, many kinds of conductors such as a plurality of two kinds of conductors 41, winding start conductors 45 and 48, winding end conductors 46 and 49, bridge lines 47 and 51, conductors 50 having a different spanning width, and reversely twisted conductors 43 are required. When converted to U-shaped conductors, 180 conductors are necessary to produce a stator winding of one rotary machine.

To produce a plurality of conductors, it is necessary first to reduce the kinds of conductors. Therefore, the plurality of two kinds of conductors 41, conductors 50 having a different spanning width, and reversely twisted conductors 43 are set in the same U shape. The winding start conductors 45 and 48 and winding end conductors 46 and 49 are made equal in the total length and the number of conductor shape kinds is set to 3.

In the simultaneous twisting forming, a construction that the terminal position on the inner diameter side is fixed and the terminal position on the outer diameter side is twisted at a twisting angle equivalent to 7 slots of the conductors 2 is used. The conductors 50 having a different spanning width, when they are set in the position of −1 at the time of conductor setting and are twisted at an angle equivalent to 7 slots, are twisted at an angle equivalent to 6 slots. The three kinds of conductors are different in the shape, so that to reserve the insulating space between the conductors after twisting, the terminals on the outer diameter side are retained, and the conductors are adhered to each other and twisted in the plus direction from the normal position, and then about ½ of the overrun angle is returned in the minus position from the normal position, and finally spring back is reduced by the twisting method in the normal position, and the insulating space between the conductors is reserved.

Embodiment 5

Figure 15:
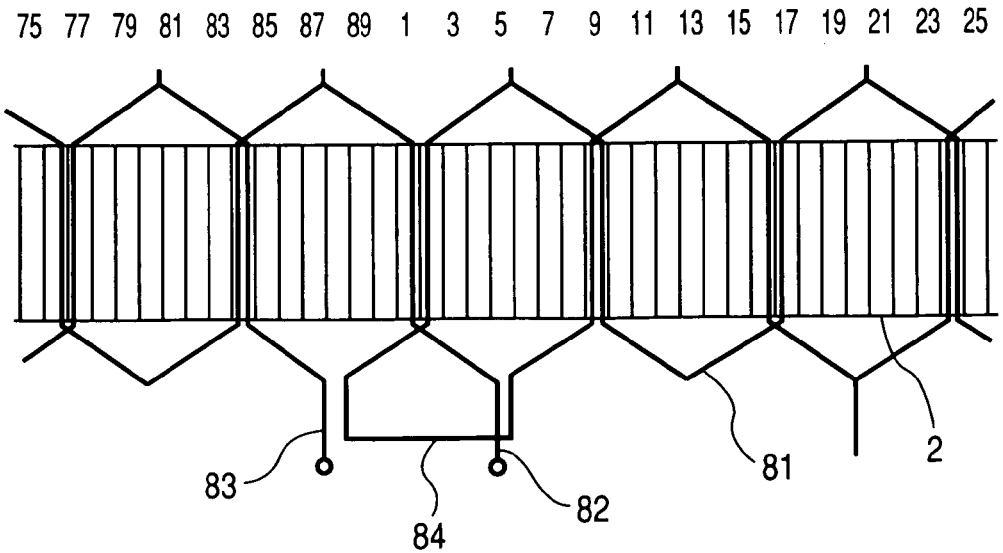
FIG. 15 is a 2T circuit diagram of the stator winding of the rotary machine in Embodiment 5.
Figure 16:
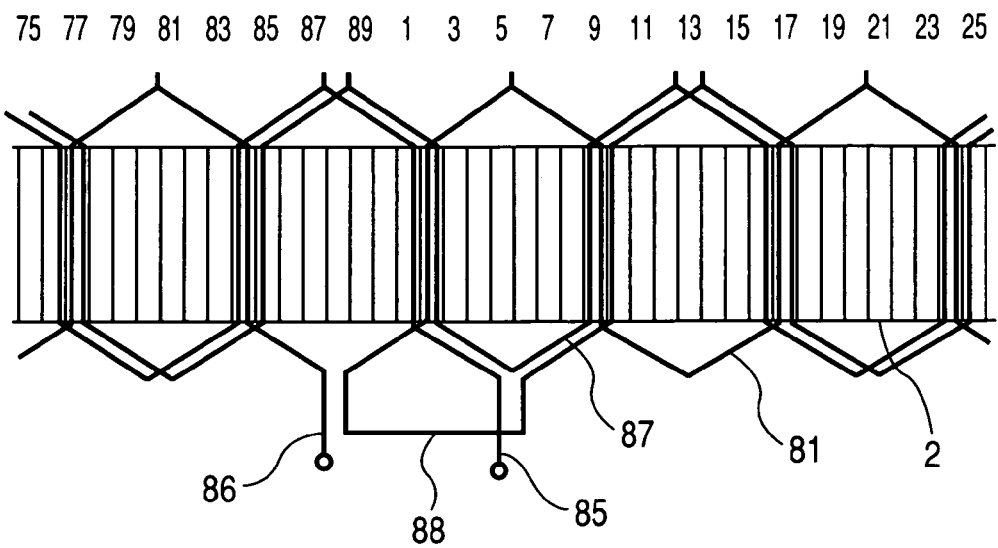
FIG. 16 is a 3T circuit diagram of the stator winding of the rotary machine in Embodiment 5.

Embodiment 5 will be explained below. FIG. 15 shows the 2T circuit diagram of the stator winding of the rotary machine and FIG. 16 shows the 3T circuit diagram of the stator winding of the rotary machine. In the winding circuit in which the number of magnetic poles is 12, and the number of slots is 90, and the number of phases of the stator winding is 3, and the number of slots per pole and per phase which is decided from the number of poles is 2.5, and one magnetic pole is composed of 5 conductors, per two magnetic poles (a pair of N pole and S pole which are different from each other) of the rotor, 15 slots are arranged. Further, four conductors are arranged in each slot and in a plurality of neighboring slots, five conductors are arranged for each magnetic pole.

In the winding circuit, four conductors are arranged in each slot in a row in the radial direction, and the conductors are divided into the first and second conductors and the third and fourth conductors from the outer peripheral side, and the inside circuit composed of the third and fourth conductors of the plurality of slots and the outside circuit composed of the first and second conductors thereof are combined, and 5 conductors combining 3 conductors of the inside circuit and 2 conductors of the outside circuit and 5 conductors combining 2 conductors of the inside circuit and 3 conductors of the outside circuit are combined, thus an almost balanced winding can be obtained.

In FIG. 15, the 2T circuit of the outside circuit will be explained below. The conductor group 8 arranged in the stator 2 is composed of a plurality of conductors 81, a winding start conductor 82, a winding end conductor 83, and bridge lines 84.

The plurality of conductors 81 are in a shape that the spanning width is equivalent to 8 slots, and the twisting angle is 32°, and the terminals at both ends are respectively arranged in the first slot and second slot from the outer peripheral side of the slots, and the terminal portion is in a shape that the spanning width is equivalent to ½ of 7 slots and the twisting angle is 14°.

Per two magnetic poles (a pair of N pole and S pole which are different from each other) of the rotor, 15 slots are arranged, so that even when the plurality of conductors 81 are in a shape that the spanning width is equivalent to 7 slots, and the terminal portion is equivalent to ½ of 8 slots, and the twisting angle is 16°, a winding circuit is realized.

The winding start conductor 82 arranged in the second slot of the slot No. 1 of the stator 1 from the outer peripheral side is connected to a plurality of conductors 81 arranged in the first slot of the slot No. 84.

The other terminal of the plurality of conductors 81 arranged in the first slot of the slot No. 84 is arranged in the second slot of the slot No. 76 across 8 slots. The other plurality of conductors 81 are arranged in the first slot of the slot No. 69 and the second slot of the slot No. 61.

The terminal in the second slot of the slot No. 76 and the terminal in the first slot of the slot No. 69 are connected, though since the terminals are positioned across 7 slots, they are mutually positioned and connected at a twisting angle of 14o equivalent to 4 slots to form the circuit.

In the plurality of conductors 81, the circuit is formed by sequentially repeating the process as mentioned above. However, when the plurality of conductors 81 are arranged in the first slot of the slot No. 9, the other is arranged in the second slot of the slot No. 1 and interferes with the winding start conductor 82. Here, the bridge lines 84 for connecting the first slot of the slot No. 9 and the first slot of the slot No. 2 are arranged to make the neighboring slots equal in the magnetic pole. In the drawing, the winding from the winding start conductor 82 to the bridge lines 24 is a counterclockwise wave winding and the winding from the bridge lines 84 to the winding end conductor 83 is a clockwise wave winding. The terminal in the first slot of the slot No. 2 of the bridge lines 84 and the terminal in the second slot of the slot No. 9 of the plurality of conductors 81 arranged in the second slot of the slot No. 9 and the first slot of the slot No. 17 are connected. Next, the terminal in the first slot of the slot No. 17 of the plurality of conductors 81 arranged in the second slot of the slot No. 9 and the first slot of the slot No. 17 and the terminal in the second slot of the slot No. 24 of the plurality of conductors 81 arranged in the second slot of the slot No. 24 and the first slot of the slot No. 32 are connected. The circuit is formed by sequentially repeating the process as mentioned above and the terminal in the first slot of the slot No. 77 of the plurality of conductors 81 arranged in the second slot of the slot No. 69 and the first slot of the slot No. 77 and the winding end conductor 83 arranged in the second slot of the slot No. 84 are connected.

Finally, the 2T wave winding circuit which starts from the winding start conductor 82, is connected counterclockwise to the bridge lines 84 via 5 conductors 81, is positioned in the neighboring slot of the bridge lines 84, and ends counterclockwise this time at the winding end conductor 83 via 5 conductors 81 is formed.

In FIG. 16, the 3T circuit of the inside circuit will be explained below. The conductor group 8 arranged in the stator 2 is composed of the plurality of conductors 81, a winding start conductor 85, a winding end conductor 86, conductors 87 having a different spanning width, and bridge lines 88.

The plurality of conductors 81 are in a shape that the spanning width is equivalent to 8 slots, and the twisting angle is 32°, and the terminals at both ends are respectively arranged in the third slot and fourth slot from the outer peripheral side of the slots. The conductors 87 having a different spanning width are in a shape that the spanning width is equivalent to 7 slots, and the twisting angle is 28°, and the terminals at both ends are respectively arranged in the third slot and fourth slot from the outer peripheral side of the slots.

The winding start conductor 85 arranged in the third slot of the slot No. 1 of the stator 2 from the outer peripheral side is connected to the plurality of conductors 81 arranged in the fourth slot of the slot No. 84. The other terminal of the plurality of conductors 81 arranged in the fourth slot of the slot No. 84 is arranged in the third slot of the slot No. 76 across 8 slots. The other plurality of conductors 81 are arranged in the fourth slot of the slot No. 69 and the third slot of the slot No. 61.

The terminal in the third slot of the slot No. 76 and the terminal in the fourth slot of the slot No. 69 are connected, though since the terminals are positioned across 7 slots, they are mutually positioned and connected at a twisting angle of 14o equivalent to 3.5 slots to form the circuit.

In the plurality of conductors 81, the circuit is formed by sequentially repeating the process as mentioned above. However, when the plurality of conductors 81 are arranged in the fourth slot of the slot No. 9, the other is arranged in the third slot of the slot No. 1 and interferes with the winding start conductor 85. Here, the conductors 87 having a different spanning width positioned in the fourth slot of the slot No. 9 and the third slot of the slot No. 2 are arranged to make the neighboring slots equal in the magnetic pole. The terminal in the third slot of the slot No. 2 of the conductors 87 having a different spanning width is connected to the plurality of conductors 81 arranged in the fourth slot of the slot No. 85. The other terminal of the plurality of conductors 81 arranged in the fourth slot of the slot No. 85 is arranged in the third slot of the slot No. 77 across 8 slots. The other plurality of conductors 81 are arranged in the fourth slot of the slot No. 70 and the third slot of the slot No. 62.

In the plurality of conductors 81, the circuit is formed by sequentially repeating the process as mentioned above. However, when the plurality of conductors 81 are arranged in the fourth slot of the slot No. 10, the other is arranged in the third slot of the slot No. 2 and interferes with the conductors 87 having a different spanning width. In the drawing, the winding from the winding start conductor 85 to the bridge lines 88 is a counterclockwise wave winding and the winding from the bridge lines 88 to the winding end conductor 88 is a clockwise wave winding. The terminal in the fourth slot of the slot No. 2 of the bridge lines 88 and the terminal in the third slot of the slot No. 9 of the plurality of conductors 81 arranged in the third slot of the slot No. 9 and the fourth slot of the slot No. 17 are connected. Next, the terminal in the fourth slot of the slot No. 17 of the plurality of conductors 81 arranged in the third slot of the slot No. 9 and the fourth slot of the slot No. 17 and the terminal in the third slot of the slot No. 24 of the plurality of conductors 81 arranged in the third slot of the slot No. 24 and the fourth slot of the slot No. 32 are connected. The circuit is formed by sequentially repeating the process as mentioned above and the terminal in the fourth slot of the slot No. 77 of the plurality of conductors 81 arranged in the third slot of the slot No. 69 and the fourth slot of the slot No. 77 and the winding end conductor 86 arranged in the third slot of the slot No. 84 are connected.

Finally, the 2T wave winding circuit which starts from the winding start conductor 85, is connected counterclockwise to the conductors 87 having a different spanning width via 5 conductors 81, is positioned in the neighboring slot of the conductors 87 having a different spanning width, and furthermore reaches counterclockwise the bridge lines 88 via 5 conductors 81 is formed, and the 3T wave winding circuit ending counterclockwise this time at the winding end conductor 86 via 5 conductors 81 is formed.

Figure 17:
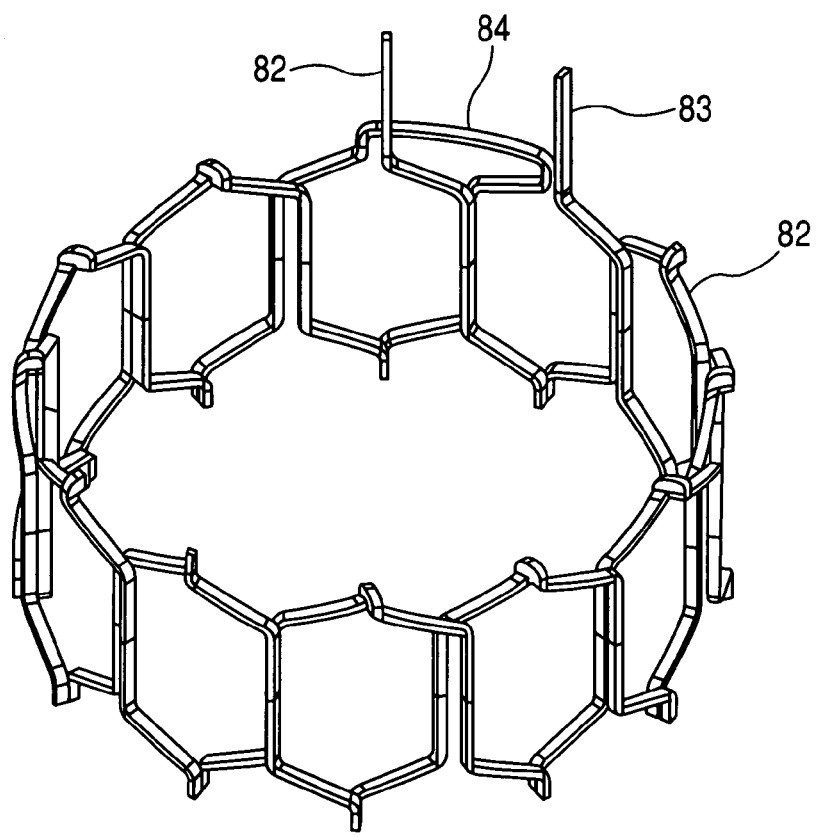
FIG. 17 is an appearance view of the outside circuit of the stator which is wave-wound by 2T in Embodiment 5.

FIG. 17 shows an appearance of the outside circuit of the stator which is wave-wound by 2T. The drawing shows a status that the winding from the winding start conductor 82 to the bridge lines 84 via 5 conductors 81 is a clockwise wave winding and the winding from the bridge lines 84 to the winding end conductor 83 via 5 conductors 81 is a counterclockwise wave winding.

Figure 18:
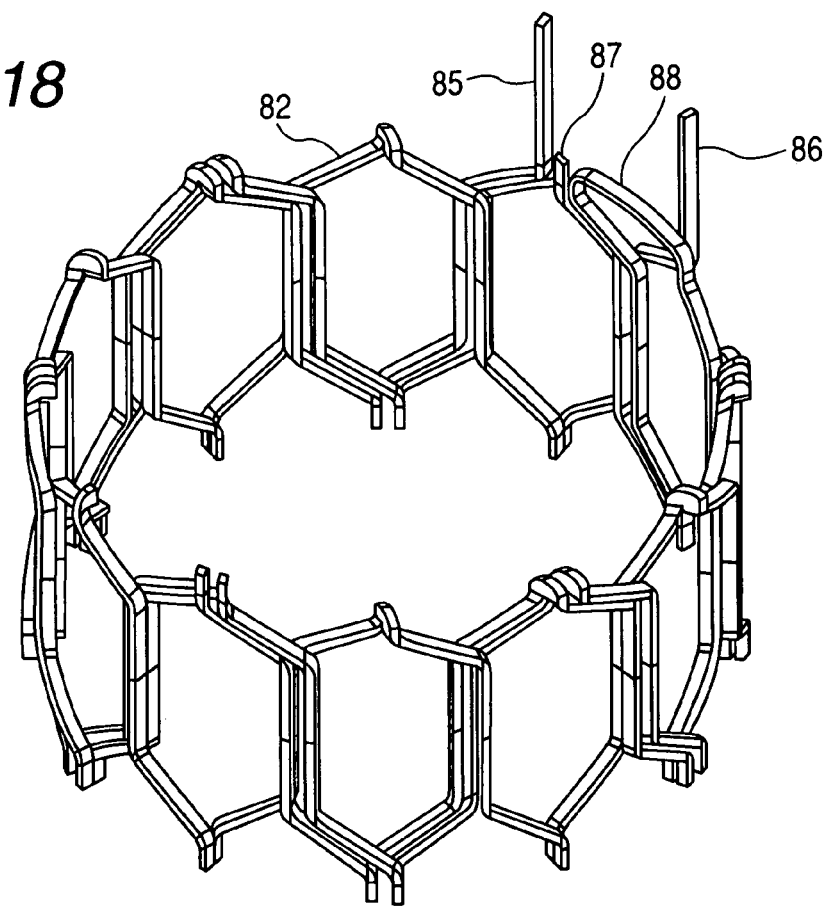
FIG. 18 is an appearance view of the outside circuit of the stator which is wave-wound by 3T in Embodiment 5.

FIG. 18 shows an appearance of the inside circuit of the stator which is wave-wound by 3T. The drawing shows a status that the winding which is connected from the winding start conductor 85 to the conductors 87 having a different spanning width via 5 conductors 81 and extends from the conductors 87 having a different spanning width to the bridge lines 88 via 5 conductors 81 is a counterclockwise wave winding and the winding extending from the bridge lines 88 to the winding end conductor 86 via 5 conductors 81 is a clockwise wave winding.

Figure 19:
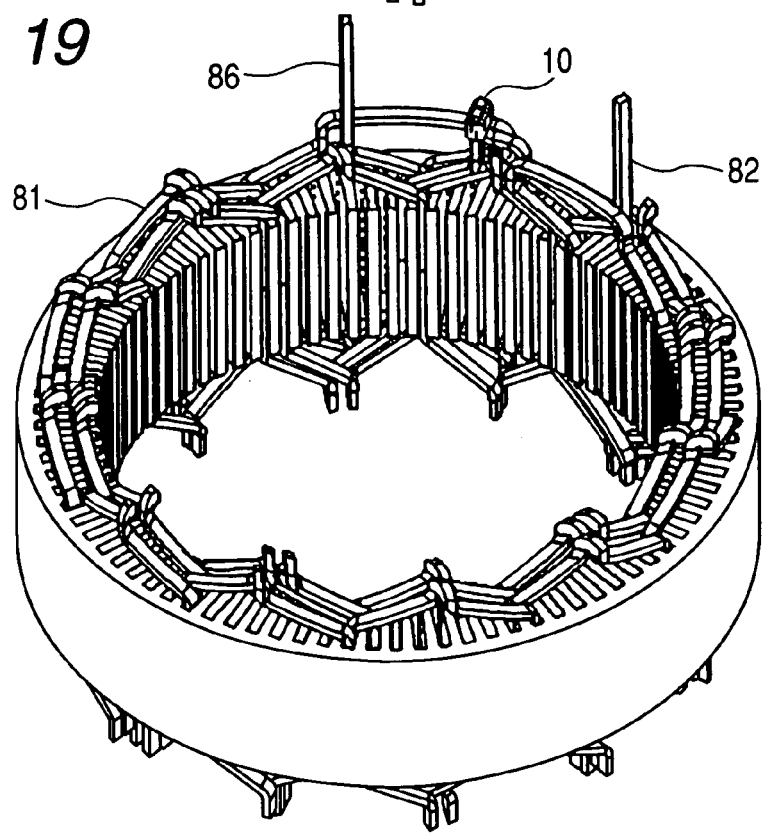
FIG. 19 is an appearance view of the stator of the rotary machine in which the part in correspondence to one phase is attached in Embodiment 5.

FIG. 19 shows an appearance of the stator of the rotary machine in which the part in correspondence to one phase is attached. The drawing shows a status that the outside 2T circuit and the inside 3T circuit are combined to a 5T wave winding. The winding end conductor 83 of the 2T circuit and the winding start conductor 85 of the 3T circuit are non-peel straight angle conductors and are connected by applying the connection method described in Patent Document 4(Japanese Application Patent Laid-open Publication No. Hei 10-4646) using a copper terminal 10 the surface of which is waxed, and a one-phase part attached status of a 5T circuit from the winding start conductor 82 of the 2T circuit to the winding end conductor 86 of the 3T circuit is obtained.

Even in a combination of the 5T wave winding obtained by combination of the outside 3T circuit and the inside 2T circuit, in the same way as with the aforementioned, when the winding end conductor of the 3T circuit and the winding start conductor of the 2T circuit are connected, the 5T circuit from the winding start conductor of the 3T circuit to the winding end conductor of the 2T circuit can be obtained.

Figures 20, 21:
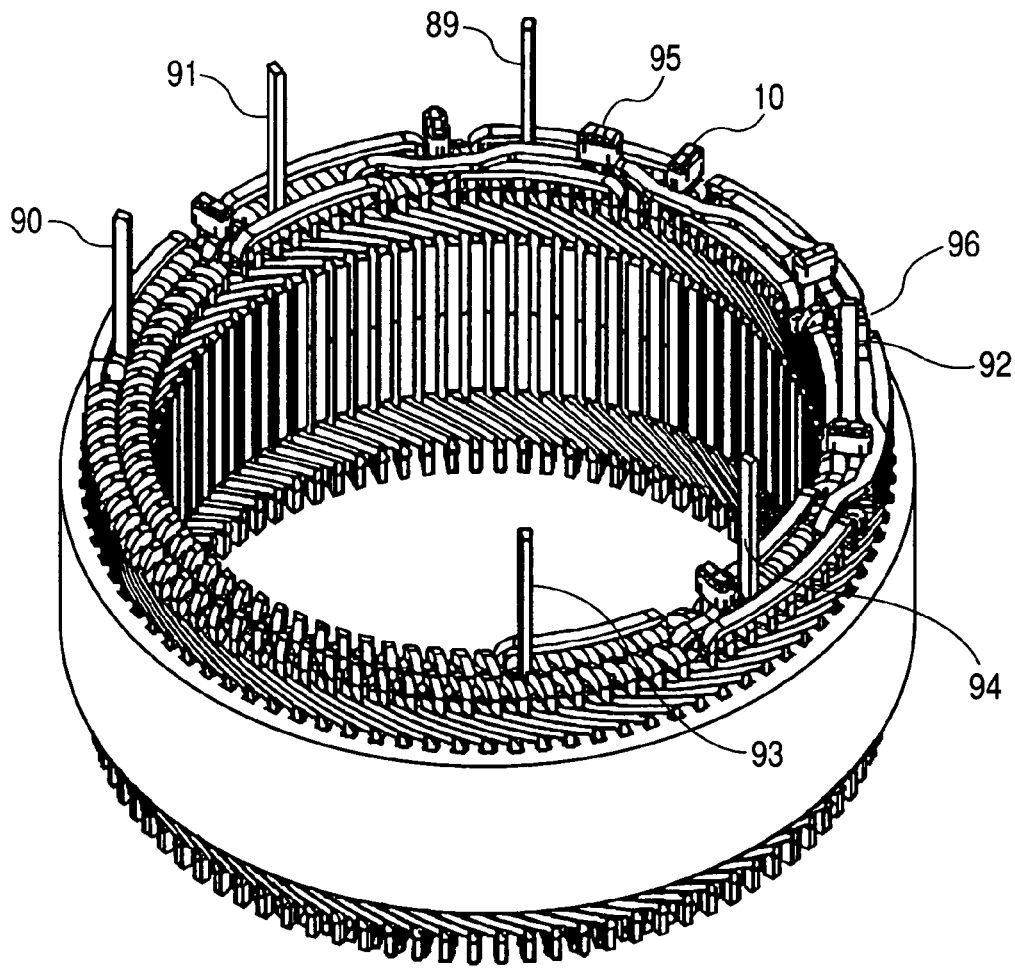
FIG. 20 is an appearance view of the stator of the rotary machine in Embodiment 5.
FIG. 21 is a layout diagram of the slots of the unbalanced winding in Embodiment 6.

FIG. 20 shows an appearance of the stator winding of the rotary machine. The stator winding is composed of two Y circuits in which phase windings 89, 90, and 91 composed of 5 windings combining 2 inside windings and 3 outside windings and phase windings 92, 93, and 94 composed of 5 windings combining 3 inside windings and 2 outside windings are arranged in appropriate positions and the phase is different at an electrical angle of 28.8°. In the drawing, the connection of a neutral point 95 of the windings 89, 90, and 91 composed of 5 windings combining 2 inside windings and 3 outside windings and a neutral point 96 of the windings 92, 93, and 94 composed of 5 windings combining 3 inside windings and 2 outside windings is realized by connecting non-peel straight angle conductors by applying the connection method described in Japanese Application Patent Laid-open Publication No. Hei 10-4646 using the copper terminal 10 the surface of which is waxed. Further, the bridge lines are arranged in the innermost layer in the position of the fourth slot and the outermost layer in the position of the first slot to form a circuit.

In the manufacturing method for the winding circuit, it is impossible to produce and attach a circuit for each phase and it is a prior condition to produce by all conductor simultaneous forming and simultaneous insertion.

For the winding circuit, many kinds of conductors such as a plurality of two kinds of conductors 81, winding start conductors 82 and 85, winding end conductors 83 and 86, bridge lines 84 and 88, and conductors 87 having a different spanning width are required. When converted to U-shaped conductors, 180 conductors are necessary to produce a stator winding of one rotary machine. To produce a plurality of conductors, it is necessary first to reduce the kinds of conductors. Therefore, the plurality of two kinds of conductors 81 and conductors 87 having a different spanning width are set in the same U shape. The winding start conductors 82 and 85 and winding end conductors 83 and 86 are made equal in the total length and the number of conductor shape kinds is set to 3. The winding circuit is composed of the inside and outside circuits, thus to the tetra structure twisting method, a simple structure of double structure and 90 conductors for each of the inside and outside circuits can respond.

In the simultaneous twisting forming, a construction that the terminal position on the inner diameter side is fixed and the terminal position on the outer diameter side is twisted at a twisting angle equivalent to 8 slots of the conductors 2 is used. The conductors 27 having a different spanning width, when they are set in the position of −1 at the time of conductor setting and are twisted at an angle equivalent to 8 slots, are twisted at an angle equivalent to 7 slots. The three kinds of conductors are different in the shape, so that to reserve the insulating space between the conductors after twisting, the terminals on the outer diameter side are retained, and the conductors are adhered to each other and twisted in the plus direction from the normal position, and then about ½ of the overrun angle is returned in the minus position from the normal position, and finally spring back is reduced by the twisting method in the normal position, and the insulating space between the conductors is reserved.

In the aforementioned winding circuit, four conductors are arranged in each slot in a row in the radial direction, and the conductors are divided into the first and second conductors and the third and fourth conductors from the outer peripheral side, and the inside circuit composed of the third and fourth conductors of the plurality of slots and the outside circuit composed of the first and second conductors thereof are combined, and 5 conductors combining 3 conductors of the inside circuit and 2 conductors of the outside circuit and 5 conductors combining 2 conductors of the inside circuit and 3 conductors of the outside circuit are combined, thus an almost balanced winding can be obtained. However, by 5 wave windings combining 2.5 wave windings of the inside circuit and 2.5 wave windings of the outside circuit, a balanced wave winding can be formed.

Embodiment 6

Embodiment 6 will be explained below. FIG. 21 is a layout diagram of slots of an unbalanced winding and shows an example of the winding circuit in which the number of magnetic poles is 12, and the number of slots is 90, and the number of phases of the stator winding is 3, and the number of slots per pole and per phase which is decided from the number of poles is 2.5, and one magnetic pole is composed of 5 conductors, and 4 conductors are arranged in each slot.

In the outside circuit, in a combination of the winding start conductor, the winding end conductor, and a plurality of conductors, a phase winding can be formed. The phase winding is arranged in an appropriate position, thus a 3-phase winding can be formed. Similarly, a 3-phase winding can be formed in the inside circuit. By this combination, an unbalanced winding of two Y circuits different in the phase can be formed. This rotary machine produces a loud noise, though can increase the output.

The present invention can be used not only in a stator of an AC generator for vehicle but also in a stator of a rotary machine for connecting conductor terminals inserted in the axial direction such as an electric car and a general-purpose generator and forming a winding.

REFERENCE NUMERALS SHOW THE FOLLOWING PARTS

1 Connection ring, 11 Conductor portion, 12 Insulating portion, 13 Slot, 2 Stator, 3 Iron core of stator, 4 Conductor group, 41 A plurality of conductors, 42 Terminal portion, 43 Reversely twisted conductor, 44 Conductor having a different spanning width, 45 Winding start conductor of 2T circuit, 46 Winding end conductor of 2T circuit, 47 Bridge line of 2T circuit, 48 Winding start conductor of 3T circuit, 49 Winding end conductor of 3T circuit, 50 Conductor having a different spanning width of 3T circuit, 51 Bridge line of 3T circuit, 52 5 phase windings combining 2 windings of inside circuit and 3 windings of outside circuit (U 1 shape), 53 5 phase windings combining 2 windings of inside circuit and 3 windings of outside circuit (V 1 shape), 54 5 phase windings combining 2 windings of inside circuit and 3 windings of outside circuit (W 1 shape), 55 5 phase windings combining 3 windings of inside circuit and 2 windings of outside circuit (U 2 shapes), 56 5 phase windings combining 3 windings of inside circuit and 2 windings of outside circuit (V 2 shapes), 57 5 phase windings combining 3 windings of inside circuit and 2 windings of outside circuit (W 2 shapes), 6 Outside circuit, 7 Inside circuit, 8 Conductor group, 81 A plurality of conductors, 82 Winding start conductor of 2T circuit, 83 Winding end conductor of 2T circuit, 84 Bridge line of 2T circuit, 85 Winding start conductor of 3T circuit, 86 Winding end conductor of 3T circuit, 87 Conductor having a different spanning width of 3T circuit, 88 Bridge line of 3T circuit, 89 5 phase windings combining 2 windings of inside circuit and 3 windings of outside circuit (U 1 shape), 90 5 phase windings combining 2 windings of inside circuit and 3 windings of outside circuit (V 1 shape), 91 5 phase windings combining 2 windings of inside circuit and 3 windings of outside circuit (W 1 shape), 92 5 phase windings combining 3 windings of inside circuit and 2 windings of outside circuit (U 2 shapes), 93 5 phase windings combining 3 windings of inside circuit and 2 windings of outside circuit (V 2 shapes), 94 5 phase windings combining 3 windings of inside circuit and 2 windings of outside circuit (W 2 shapes), 95 Neutral point 1, 96 Neutral point 2, Copper terminal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotary machine comprising;
   a stator which has a stator iron core having a plurality of slots formed in a direction of a rotation axis and stator windings being constituted with a plurality of conductors respectively inserted into said plurality of slots; and
   a rotor having a plurality of magnetic poles arranged so that their polarities alternately differs in a rotational direction and positioned inside said stator with an air gap between said rotor and said stator,
   wherein said stator windings comprise plural sets of multi-phase windings, and each set of multi-phase windings comprises a 3-phase windings, and each phase winding of said 3-phase winding comprises said plurality of conductors electrically connected across said slots of said stator iron core so as to correspond to said plurality of magnetic poles,
   wherein the number of slots in stator is 90 the number of stator-magnetic poles is 12 per pair of a rotor-magnetic N-pole and a S-pole; the number of conductors of each stator-magnetic pole is 5; the number of slots decided from the number of stator-magnetic poles if 2.5 per phase, per pole and per two magnetic poles of said rotor, and
   wherein said 3-phase winding of said stator is two sets per said two magnetic poles of said rotor,
   wherein said two sets of 3-phase windings have a double circuits of an inside circuit and, an outside circuit being formed in said slots, and
   wherein said 2.5 slots per phase and per pole have a combination of 3 inside circuit-conductors and 2 outside circuit-conductors and a combination of 2 inside circuit-conductors and 3 outside circuit-conductors, namely, two different combinations of said 5 conductors.

2. A rotary machine according to claim 1, wherein 15 slots are arranged per said namely for said pair of rotor-magnetic N-pole and S-pole, and said stator windings are electrically connected by said conductors at an angle that a spanning width is equivalent to 8 slots and at an angle that a twisting angle of both terminals is equivalent to 3.5 slots.

* * * * *